US012693269B2

(12) United States Patent
Alharith

(10) Patent No.: US 12,693,269 B2
(45) Date of Patent: Jul. 28, 2026

(54) DETERMINING EFFECTS OF ACOUSTIC ENERGY ON FLUID AND ROCK INTERACTIONS

(71) Applicant: Saudi Arabian Oil Company, Dhahran (SA)

(72) Inventor: Abdullah M. Alharith, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 347 days.

(21) Appl. No.: 18/433,849

(22) Filed: Feb. 6, 2024

(65) Prior Publication Data
US 2025/0251368 A1 Aug. 7, 2025

(51) Int. Cl.
*G01N 29/04* (2006.01)
*E21B 47/00* (2012.01)
(Continued)

(52) U.S. Cl.
CPC ........... *G01N 29/043* (2013.01); *E21B 47/00* (2013.01); *E21B 47/107* (2020.05);
(Continued)

(58) Field of Classification Search
CPC .. G01N 33/2823; G01N 33/241; G01N 33/24; G01N 15/0826; G01N 15/08; G01N 29/024; G01N 2291/02818; G01N 29/07; G01N 11/16; G01N 9/002; G01N 9/26; G01N 33/28; G01N 2291/044; G01N 2291/02836; G01N 1/14; G01N 29/222;

G01N 15/082; G01N 2291/02416; G01N 9/36; G01N 15/088; G01N 9/24; G01N 33/243; G01N 21/85; G01N 24/081;
(Continued)

(56) References Cited

U.S. PATENT DOCUMENTS 5,493,226 A 2/1996 Honarpour et al.
5,679,885 A 10/1997 Lenormand et al.
(Continued)

FOREIGN PATENT DOCUMENTS

BR 112016016442 B1 * 3/2022 ........... G01N 29/028
CN 107389794 B * 1/2020 ........... G01N 29/041
(Continued)

OTHER PUBLICATIONS

Peng et al., "The effect of rock permeability and porosity on seismoelectric conversion: experiment and analytical modelling," Geophysical Journal International, Oct. 2019, 219(1):328-345, 34 pages.
(Continued)

*Primary Examiner* — Andre J Allen
(74) *Attorney, Agent, or Firm* — Fish & Richardson P.C.

(57) ABSTRACT
Systems and methods for determining effects of acoustic energy on fluid and rock interactions include a housing including a housing body and a cover; an elastomeric base disposed within the housing body; a gasket disposed between the housing body and the cover when the cover is installed on the housing body; a cylinder simulating a wellbore protruding through the cover and a connection port attached at one end of the cylinder; one or more sensors disposed on the housing body; and an acoustic transducer disposed in the cylinder.

20 Claims, 7 Drawing Sheets

(51) Int. Cl.

| | |
|---|---|
| *E21B 47/107* | (2012.01) |
| *E21B 49/00* | (2006.01) |
| *G01N 1/44* | (2006.01) |
| *G01N 29/22* | (2006.01) |

(52) U.S. Cl.
CPC .............. *E21B 49/003* (2013.01); *G01N 1/44* (2013.01); *G01N 29/223* (2013.01); *G01N 2291/0232* (2013.01); *G01N 2291/02441* (2013.01); *G01N 2291/02836* (2013.01); *G01N 2291/101* (2013.01)

(58) Field of Classification Search
CPC ...... G01N 29/036; G01N 1/10; G01N 1/2035; G01N 2030/8854; G01N 2291/015; G01N 229/106; G01N 29/225; G01N 21/31; G01N 2291/0285; G01N 29/28; G01N 11/08; G01N 2291/2433; G01N 11/00; G01N 11/14; G01N 2009/006; G01N 2291/02872; G01N 2291/105; G01N 29/032; G01N 7/14; G01N 1/2294; G01N 15/0806; G01N 2291/02827; G01N 27/221; G01N 33/383; G01N 1/12; G01N 2291/2636; G01N 29/348; G01N 21/8507; G01N 29/263; G01N 21/1702; G01N 2291/0421; G01N 2291/102; G01N 30/88; G01N 33/18; G01N 1/22; G01N 29/14; G01N 9/00; G01N 1/08; G01N 15/06; G01N 21/274; G01N 2291/014; G01N 2291/048; G01N 25/18; G01N 7/00; G01N 15/0893; G01N 21/552; G01N 1/16; G01N 11/04; G01N 21/3577; G01N 21/359; G01N 25/00; G01N 29/227; G01N 2291/011; G01N 2291/02881; G01N 2291/0422; G01N 29/046; G01N 29/38; G01N 29/46; G01N 13/00; G01N 2021/1704; G01N 21/64; G01N 21/65; G01N 2291/2675; G01N 29/069; G01N 3/10; G01N 30/02; G01N 33/2835; G01N 15/04; G01N 21/3504; G01N 2203/0256; G01N 23/046; G01N 29/02; G01N 3/32; G01N 3/58; G01N 33/0006; G01N 33/2841; G01N 33/287; G01N 13/02; G01N 2021/1708; G01N 2223/419; G01N 2291/022; G01N 2291/02408; G01N 2291/0427; G01N 2291/045; G01N 27/223; G01N 29/11; G01N 29/2425; G01N 29/30; G01N 33/0047; G01N 2001/1025; G01N 2001/2267; G01N 2009/263; G01N 2030/8886; G01N 2223/616; G01N 2291/018; G01N 25/02; G01N 29/022; G01N 29/2418; G01N 1/04; G01N 1/2247; G01N 1/34; G01N 11/167; G01N 2001/2232; G01N 2030/025; G01N 2291/0232; G01N 2291/02441; G01N 2291/0256; G01N 2291/101; G01N 25/14; G01N 25/60; G01N 29/028; G01N 29/223; G01N 33/225; G01N 2021/3595; G01N 2021/8528; G01N 2030/146; G01N 21/0303; G01N 21/05; G01N 21/314; G01N 23/02; G01N 27/02; G01N 27/22; G01N 29/04; G01N 3/40; G01N 33/2847; G01N 11/02; G01N 15/00; G01N 2001/1031; G01N 2013/0275; G01N 2015/0053; G01N 2015/0846; G01N 2021/855; G01N 21/33; G01N 21/461; G01N 22/00; G01N 22/04; G01N 2291/2634; G01N 223/06; G01N 27/043; G01N 29/245; G01N 29/2462; G01N 29/2468; G01N 29/32; G01N 3/00; G01N 9/04; G01N 1/18; G01N 1/2202; G01N 1/405; G01N 2015/0866; G01N 2021/3129; G01N 21/39; G01N 21/59; G01N 21/91; G01N 21/954; G01N 2201/06113; G01N 2201/0697; G01N 2291/0289; G01N 23/12; G01N 27/06; G01N 27/74; G01N 29/4418; G01N 30/06; G01N 5/04; G01N 1/24; G01N 1/286; G01N 11/10; G01N 15/02; G01N 15/0272; G01N 15/0618; G01N 15/0656; G01N 15/0886; G01N 19/04; G01N 19/10; G01N 2001/1037; G01N 2001/1062; G01N 2001/4016; G01N 2030/126; G01N 21/01; G01N 21/255; G01N 21/55; G01N 21/6447; G01N 21/645; G01N 21/718; G01N 21/80; G01N 2203/0053; G01N 2203/0067; G01N 2203/0232; G01N 2203/0676; G01N 2223/635; G01N 2291/0222; G01N 2291/0226; G01N 2291/0231; G01N 2291/024; G01N 2291/103; G01N 23/025; G01N 23/203; G01N 27/07; G01N 27/08; G01N 27/82; G01N 27/9046; G01N 29/043; G01N 29/228; G01N 29/27; G01N 29/42; G01N 29/4481; G01N 3/42; G01N 3/48; G01N 3/56; G01N 30/34; G01N 30/8686; G01N 31/10; G01N 31/22; G01N 33/055; G01N 33/26; G01N 33/42; G01N 5/045; G01N 7/04; G01N 7/10; G01N 9/18; G01N 9/28; G01N 9/34; G01N 1/00; G01N 1/20; G01N 11/06; G01N 11/162; G01N 15/0205; G01N 2001/007; G01N 2001/021; G01N 2001/1427; G01N 2011/0046; G01N 2011/006; G01N 2011/0073; G01N 2011/0086; G01N 2011/0093; G01N 2013/006; G01N 2015/0092; G01N 2015/0833; G01N 2015/084; G01N 2021/1723; G01N 2021/399; G01N 2021/8557; G01N 2030/143; G01N 2035/0489; G01N 21/00; G01N 21/1717; G01N 21/35; G01N 21/3563; G01N 21/43; G01N 21/534; G01N 21/6402; G01N 21/658; G01N 21/67; G01N 21/69; G01N 21/73; G01N 2223/423; G01N 2291/012; G01N 2291/0224; G01N 2291/0234; G01N 2291/02425; G01N 2291/028; G01N 2291/0426; G01N 23/083; G01N 24/082; G01N 25/005; G01N 25/04; G01N 27/04; G01N 27/12; G01N 27/226; G01N 27/414; G01N 27/44791; G01N 27/72; G01N 29/22; G01N 29/24; G01N 29/2412; G01N 29/2437; G01N 29/4436; G01N 29/4472; G01N 33/0031; G01N 33/0075; G01N 9/30; G01N 1/2205; G01N 1/2211; G01N 1/2226; G01N 1/26; G01N 1/2813; G01N 1/36; G01N 1/38; G01N 13/04; G01N 15/0227; G01N 15/1404; G01N 15/133; G01N 17/00;

G01N 17/02; G01N 19/02; G01N
2001/1463; G01N 2001/2007; G01N
2001/2064; G01N 2001/2071; G01N
2001/248; G01N 2001/2866; G01N
2001/2873; G01N 2001/386; G01N
2001/4061; G01N 2001/4066; G01N
2001/4088; G01N 2011/0026; G01N
2011/0053; G01N 2011/008; G01N
2011/147; G01N 2013/003; G01N
2013/0266; G01N 2015/0019; G01N
2015/0096; G01N 2015/0813; G01N
2015/0853; G01N 2015/1027; G01N
2015/1413; G01N 2015/1493; G01N
2021/0106; G01N 2021/0187; G01N
2021/0307; G01N 2021/0346; G01N
2021/1727; G01N 2021/1761; G01N
2021/3174; G01N 2021/3536; G01N
2021/458; G01N 2021/635; G01N
2021/6417; G01N 2021/6421; G01N
2021/6478; G01N 2021/6493; G01N
2021/651; G01N 2021/653; G01N
2021/8405; G01N 2021/8427; G01N
2021/8521; G01N 2030/0095; G01N
2030/047; G01N 2030/567; G01N
2035/00702; G01N 2035/0081; G01N
2035/009; G01N 21/11; G01N 21/17;
G01N 21/21; G01N 21/211; G01N 21/27;
G01N 21/3586; G01N 21/45; G01N
21/51; G01N 21/5911; G01N 21/6452;
G01N 21/6486; G01N 21/8806; G01N
21/90; G01N 2201/024; G01N
2201/0696; G01N 2201/084; G01N
2201/12746; G01N 2201/129; G01N
2201/1296; G01N 2203/005; G01N
2203/0016; G01N 2203/0021; G01N
2203/0023; G01N 2203/0037; G01N
2203/0039; G01N 2203/0044; G01N
2203/0055; G01N 2203/0066; G01N
2203/0073; G01N 2203/0076; G01N
2203/0082; G01N 2203/0083; G01N
2203/0218; G01N 2203/0222; G01N
2203/0226; G01N 2203/023; G01N
2203/024; G01N 2203/0246; G01N
2203/0248; G01N 2203/0266; G01N
2203/0274; G01N 2203/0284; G01N
2203/0286; G01N 2223/076; G01N
2223/1013; G01N 2223/649; G01N
2291/01; G01N 2291/021; G01N
2291/0235; G01N 2291/0251; G01N
2291/0258; G01N 2291/02809; G01N
2291/02863; G01N 2291/2626; G01N
2291/267; G01N 2291/269; G01N
2291/2693; G01N 2291/2694; G01N
2291/2698; G01N 23/005; G01N 23/043;
G01N 23/18; G01N 23/201; G01N
23/222; G01N 23/223; G01N 25/66;
G01N 25/72; G01N 27/023; G01N
27/048; G01N 27/16; G01N 27/18; G01N
27/185; G01N 27/4035; G01N 27/4146;
G01N 27/4168; G01N 27/60; G01N
27/902; G01N 27/9026; G01N 27/9093;
G01N 29/045; G01N 29/075; G01N
29/2431; G01N 29/2481; G01N 29/2493;
G01N 29/275; G01N 29/40; G01N 29/44;
G01N 29/4445; G01N 29/4454; G01N

29/449; G01N 29/48; G01N 3/064; G01N
3/08; G01N 3/26; G01N 3/307; G01N
3/317; G01N 3/38; G01N 30/28; G01N
30/46; G01N 30/6095; G01N 30/62;
G01N 30/8693; G01N 33/0009; G01N
33/0011; G01N 33/0016; G01N 33/0027;
G01N 33/0032; G01N 33/0036; G01N
33/004; G01N 33/0057; G01N 33/1866;
G01N 33/20; G01N 33/227; G01N
33/2805; G01N 33/2811; G01N 33/2882;
G01N 33/2888; G01N 33/30; G01N
33/38; G01N 33/388; G01N 35/00594;
G01N 35/00613; G01N 35/00693; G01N
35/1079; G01N 35/1097; G01N 5/00;
G01N 5/025; G01N 9/10; G01N 9/266;
G01N 9/32; G01N 1/2042; G01N 1/28;
G01N 1/44; G01N 11/165; G01N
15/0255; G01N 15/042; G01N 15/1484;
G01N 2001/1056; G01N 2001/205; G01N
2011/001; G01N 2011/0033; G01N
2015/0011; G01N 2015/0061; G01N
2015/0288; G01N 2015/045; G01N
2015/0873; G01N 2021/0375; G01N
2021/0389; G01N 2021/0396; G01N
2021/1706; G01N 2021/8592; G01N
2030/065; G01N 2030/324; G01N
2035/00148; G01N 2035/00514; G01N
21/23; G01N 21/59; G01N 21/82; G01N
21/84; G01N 2201/069; G01N
2201/1293; G01N 23/00; G01N 23/16;
G01N 25/08; G01N 25/16; G01N
2500/00; G01N 2500/10; G01N 27/26;
G01N 29/00; G01N 29/041; G01N 29/06;
G01N 29/0654; G01N 29/09; G01N
29/12; G01N 29/323; G01N 29/326;
G01N 29/343; G01N 29/50; G01N 3/12;
G01N 30/16; G01N 30/32; G01N
30/8675; G01N 31/224; G01N 33/00;
G01N 33/0004; G01N 33/1833; G01N
33/5082; G01N 33/5308; G01N 33/567;
G01N 35/00871; G01N 35/08; G01N
35/085; E21B 47/06; E21B 47/10; E21B
49/10; E21B 47/00; E21B 49/005; E21B
49/00; E21B 49/08; E21B 21/08; E21B
49/008; E21B 44/00; E21B 47/12; E21B
49/081; E21B 47/01; E21B 47/04; E21B
47/11; E21B 47/07; E21B 47/09; E21B
49/087; E21B 47/113; E21B 49/006;
E21B 45/00; E21B 47/017; E21B 43/26;
E21B 47/007; E21B 47/022; E21B
49/088; E21B 49/0875; E21B 47/107;
E21B 47/103; E21B 47/18; E21B 49/082;
E21B 49/02; E21B 47/024; E21B 47/117;
E21B 49/003; E21B 47/047; E21B 47/08;
E21B 47/135; E21B 33/1243; E21B
17/1021; E21B 12/02; E21B 43/16; E21B
43/12; E21B 47/002; E21B 47/02; E21B
23/14; E21B 41/00; E21B 33/127; E21B
47/005; E21B 47/13; E21B 47/16; E21B
47/26; E21B 47/111; E21B 49/084; E21B
47/009; E21B 47/085; E21B 21/01; E21B
17/003; E21B 44/005; E21B 47/026;
E21B 21/067; E21B 43/14; E21B 43/24;
E21B 49/086; E21B 49/06; E21B 47/14;
E21B 47/24; E21B 17/028; E21B 4/02;

E21B 41/0085; E21B 47/003; E21B 7/04;
E21B 33/124; E21B 43/127; E21B
33/138; E21B 25/00; E21B 43/34; E21B
23/00; E21B 43/00; E21B 23/08; E21B
47/013; E21B 49/0813; E21B 47/092;
E21B 33/13; E21B 21/001; E21B 21/00;
E21B 33/14; E21B 47/001; E21B
47/0025; E21B 49/083; E21B 7/06; E21B
43/25; E21B 47/006; E21B 47/114; E21B
19/22; E21B 33/12; E21B 17/206; E21B
21/06; E21B 21/065; E21B 25/08; E21B
43/20; E21B 37/06; E21B 43/2607; E21B
47/008; E21B 47/098; E21B 33/1275;
E21B 34/14; E21B 47/138; E21B
49/0815; E21B 21/003; E21B 23/02;
E21B 41/0035; E21B 10/00; E21B 27/02;
E21B 43/121; E21B 43/08; E21B 43/122;
E21B 17/01; E21B 2200/22; E21B
23/006; E21B 23/03; E21B 34/06; E21B
37/00; E21B 43/119; E21B 43/267; E21B
17/006; E21B 19/08; E21B 41/0064;
E21B 41/02; E21B 43/38; E21B 7/068;
E21B 19/09; E21B 23/01; E21B 21/066;
E21B 36/04; E21B 43/11; E21B 47/0236;
E21B 33/1277; E21B 43/128; E21B
47/095; E21B 23/024; E21B 28/00; E21B
47/053; E21B 19/00; E21B 19/20; E21B
43/006; E21B 7/061; E21B 25/005; E21B
33/1208; E21B 34/10; E21B 43/04; E21B
44/04; E21B 47/0175; E21B 17/10; E21B
34/066; E21B 43/086; E21B 49/001;
E21B 17/023; E21B 19/084; E21B
21/062; E21B 21/10; E21B 33/03; E21B
36/003; E21B 43/2401; E21B 7/00; E21B
17/1014; E21B 17/16; E21B 17/203;
E21B 21/103; E21B 33/0355; E21B
33/06; E21B 34/04; E21B 34/08; E21B
34/16; E21B 41/0021; E21B 43/116;
E21B 7/046; E21B 17/1078; E21B
21/085; E21B 31/03; E21B 33/064; E21B
33/1246; E21B 33/134; E21B 36/001;
E21B 17/0283; E21B 17/0285; E21B
19/086; E21B 29/10; E21B 31/00; E21B
33/126; E21B 47/0224; E21B 7/067;
E21B 17/00; E21B 17/20; E21B 220/20;
E21B 23/06; E21B 33/068; E21B
33/1216; E21B 43/003; E21B 43/103;
E21B 43/123; E21B 43/164; E21B 43/30;
E21B 47/0232; E21B 47/22; E21B 17/07;
E21B 17/1042; E21B 19/166; E21B
21/002; E21B 21/16; E21B 25/06; E21B
29/06; E21B 33/043; E21B 33/085; E21B
33/1294; E21B 36/00; E21B 41/0057;
E21B 43/10; E21B 43/117; E21B
43/2406; E21B 19/02; E21B 2200/02;
E21B 23/001; E21B 25/02; E21B 33/063;
E21B 34/108; E21B 34/12; E21B 43/105;
E21B 43/129; E21B 43/27; E21B 7/12;
E21B 7/24; E21B 10/32; E21B 10/60;
E21B 10/62; E21B 17/025; E21B 17/042;
E21B 17/1057; E21B 17/18; E21B 19/16;
E21B 19/165; E21B 23/0411; E21B
23/10; E21B 25/04; E21B 27/00; E21B
3/00; E21B 33/072; E21B 33/10; E21B
4/00; E21B 43/28; E21B 43/305; E21B

44/02; E21B 47/125; E21B 7/025; E21B
7/062; E21B 7/10; E21B 7/28; E21B
10/02; E21B 10/42; E21B 17/021; E21B
17/026; E21B 21/063; E21B 23/042;
E21B 25/10; E21B 25/16; E21B 31/005;
E21B 31/035; E21B 31/14; E21B 33/128;
E21B 33/16; E21B 4/18; E21B 41/04;
E21B 43/1195; E21B 43/17; E21B 7/065;
E21B 7/124; E21B 7/20; E21B 10/64;
E21B 17/046; E21B 17/08; E21B
17/1035; E21B 17/1085; E21B 19/008;
E21B 19/089; E21B 19/24; E21B 21/07;
E21B 23/0419; E21B 29/02; E21B 3/022;
E21B 3/04; E21B 3/06; E21B 31/1075;
E21B 33/04; E21B 33/05; E21B 33/122;
E21B 33/1291; E21B 33/1295; E21B
34/063; E21B 35/00; E21B 41/0007;
E21B 43/02; E21B 43/082; E21B 43/114;
E21B 43/124; E21B 43/243; E21B 43/40;
E21B 44/06; E21B 49/04; E21B 7/022;
E21B 7/064; E21B 7/128; E21B 7/26;
E21B 1/00; E21B 10/26; E21B 10/322;
E21B 10/44; E21B 17/14; E21B 21/12;
E21B 2200/04; E21B 2200/05; E21B
29/002; E21B 3/02; E21B 31/12; E21B
33/035; E21B 34/025; E21B 34/142;
E21B 37/08; E21B 4/04; E21B 41/0099;
E21B 43/162; E21B 43/255; E21B
43/281; E21B 43/385; E21B 7/02; E21B
7/265; E21B 1/04; E21B 1/14; E21B
10/16; E21B 10/20; E21B 10/22; E21B
10/46; E21B 10/54; E21B 10/61; E21B
10/66; E21B 12/00; E21B 12/06; E21B
15/02; E21B 17/015; E21B 17/02; E21B
17/03; E21B 17/04; E21B 17/06; E21B
17/073; E21B 17/1028; E21B 17/1064;
E21B 17/22; E21B 19/002; E21B 19/06;
E21B 19/07; E21B 19/083; E21B 19/087;
E21B 19/10; E21B 21/02; E21B 21/106;
E21B 21/14; E21B 23/004; E21B
23/04115; E21B 23/0413; E21B 23/0416;
E21B 25/18; E21B 27/005; E21B 29/12;
E21B 31/06; E21B 31/16; E21B 31/18;
E21B 33/0353; E21B 33/0385; E21B
33/0407; E21B 33/0415; E21B 33/061;
E21B 33/076; E21B 33/1292; E21B
33/165; E21B 34/02; E21B 34/085; E21B
34/101; E21B 34/102; E21B 34/105;
E21B 37/10; E21B 4/06; E21B 4/14;
E21B 4/145; E21B 4/20; E21B 41/005;
E21B 41/0071; E21B 41/0078; E21B
241/08; E21B 43/017; E21B 43/025;
E21B 43/045; E21B 43/084; E21B
43/088; E21B 43/101; E21B 43/112;
E21B 43/1185; E21B 43/2408; E21B
43/2605; E21B 43/261; E21B 43/32;
E21B 44/08; E21B 47/0228; E21B
49/025; E21B 7/001; E21B 7/021; E21B
7/024; E21B 7/028; E21B 7/132; E21B
7/14; E21B 7/18; E21B 7/205; E21B
1/02; E21B 10/40; E21B 10/43; E21B
17/085; E21B 2200/09; E21B 23/0422;
E21B 23/12; E21B 33/00; E21B 33/0422;

E21B 33/129; E21B 34/00; E21B 34/045;
E21B 37/02; E21B 40/01; E21B 43/247;
E21B 43/263; E21B 43/36
USPC ...................................... 73/152, 3.01–152.62
See application file for complete search history.

(56) References Cited

U.S. PATENT DOCUMENTS

| | | | | |
|---|---|---|---|---|
| 5,868,030 | A | 2/1999 | Brumley et al. | |
| 7,486,070 | B2 | 2/2009 | Madio et al. | |
| 8,365,599 | B2 * | 2/2013 | Bellin | G01N 29/14 |
| | | | | 702/56 |
| 11,225,856 | B2 | 1/2022 | Clark et al. | |
| 11,913,319 | B2 | 2/2024 | Al Alharith et al. | |
| 2004/0128072 | A1 * | 7/2004 | Mandal | E21B 49/003 |
| | | | | 702/6 |
| 2015/0085611 | A1 * | 3/2015 | Mandal | E21B 47/16 |
| | | | | 367/82 |
| 2015/0168286 | A1 | 6/2015 | Mikhailov et al. | |
| 2022/0397692 | A1 * | 12/2022 | Carminati | G01V 1/52 |
| 2024/0019204 | A1 | 1/2024 | Qurashi et al. | |
| 2024/0426733 | A1 * | 12/2024 | Al-Malki | E21B 49/06 |

FOREIGN PATENT DOCUMENTS

| | | | | | |
|---|---|---|---|---|---|
| CN | 106442718 | B | * | 7/2020 | |
| CN | 117782844 | A | * | 3/2024 | |
| GB | 2466899 | A | * | 7/2010 | E21B 43/00 |
| WO | WO-2009086279 | A2 | * | 7/2009 | E21B 43/00 |

OTHER PUBLICATIONS

Poesio et al., "An investigation of the influence of acoustic waves on the liquid flow through a porous material," The Journal of the Acoustical Society of America, May 2002, 111:2019-2025, 7 pages.

* cited by examiner

DETERMINING EFFECTS OF ACOUSTIC ENERGY ON FLUID AND ROCK INTERACTIONS

TECHNICAL FIELD

This disclosure generally relates to determining effects of acoustic energy on fluid and rock interactions.

BACKGROUND

Acoustic energy (e.g., propagating sound waves) can be used to stimulate fluid flow through porous media (e.g., rocks in a subsurface oil or gas reservoir). Many factors affect the flow of the fluids through the porous media and the effects of the acoustic energy on the flow of the fluid. Acoustic stimulation is useful, for example, in enhanced oil recovery to produce hydrocarbons from unconventional subsurface reservoirs.

SUMMARY

This disclosure describes systems and methods for determining effects of acoustic energy on fluid and rock interactions. A subsurface reservoir can be mimicked at a laboratory scale by placing a rock sample from the subsurface reservoir into a housing. The housing can have a simulated well bore to inject fluids into a middle portion of the rock sample. The rock sample can be flooded with different fluids (e.g., water, oil, gas, chemicals). Acoustic waves can be generated to pass through the rock sample with various acoustic powers, frequencies, and shapes. Effects of the acoustic energy (e.g., acoustic waves) on the flow of the fluids through the rock sample can be evaluated by taking measurements of fluid properties (e.g., flow rate, pressure, temperature) and effective rock properties (e.g., permeability) before, during and after the acoustic energy propagates through the rock sample.

A housing can include a housing body to hold a rock sample and a cover. An elastomeric base can be positioned within the housing body to cushion the rock sample and relieve stresses when the rock sample is positioned in the housing body. A gasket can be positioned between the housing body and the cover when the cover is installed on the housing body. A cylinder can simulate a wellbore and protrude through the cover with a connection port at one end of the cylinder. One or more sensors can be positioned on the housing body. An acoustic transducer can be positioned in the cylinder.

Implementations of the systems and methods of this disclosure can provide various technical benefits. The housing can accommodate large rock samples providing a larger area to observe the fluid flow and the effects of acoustic energy propagation on the fluid flow through the rock samples as compared with an apparatus using core sample plugs. The housing can be elevated to reservoir pressures and temperatures to mimic reservoir conditions in a subsurface formation providing realistic experimental results. The housing enables rock samples to be easily loaded and unloaded reducing effort and time required to change experimental conditions. The systems and methods of this disclosure can be used for determining the effects of flowing different types of fluids on the permeability of the rock sample.

The details of one or more implementations of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for determining effects of acoustic energy on fluid and rock interactions. A housing can include a housing body to hold a rock sample and a cover. An elastomeric base can be positioned within the housing body to cushion the rock sample and relieve stresses when the rock sample is positioned in the housing body. A gasket can be positioned between the housing body and the cover when the cover is installed on the housing body. A cylinder can simulate a wellbore and protrude through the cover with a connection port at one end of the cylinder. One or more sensors can be positioned on the housing body. An acoustic transducer can be positioned in the cylinder.

Figure 1:
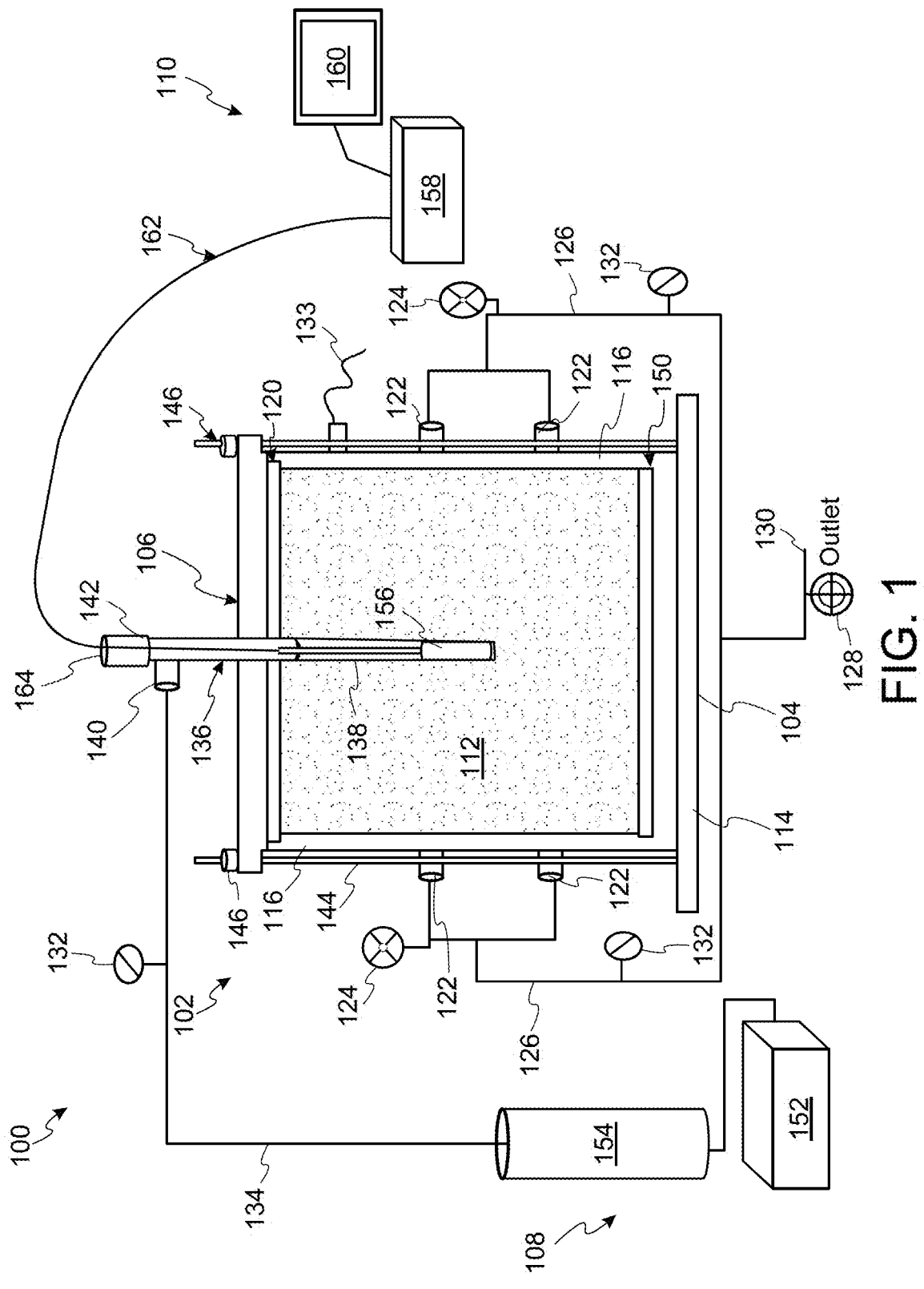
FIG. 1 is schematic illustration of a system for determining effects of acoustic energy on fluid and rock interactions.
Figure 2:
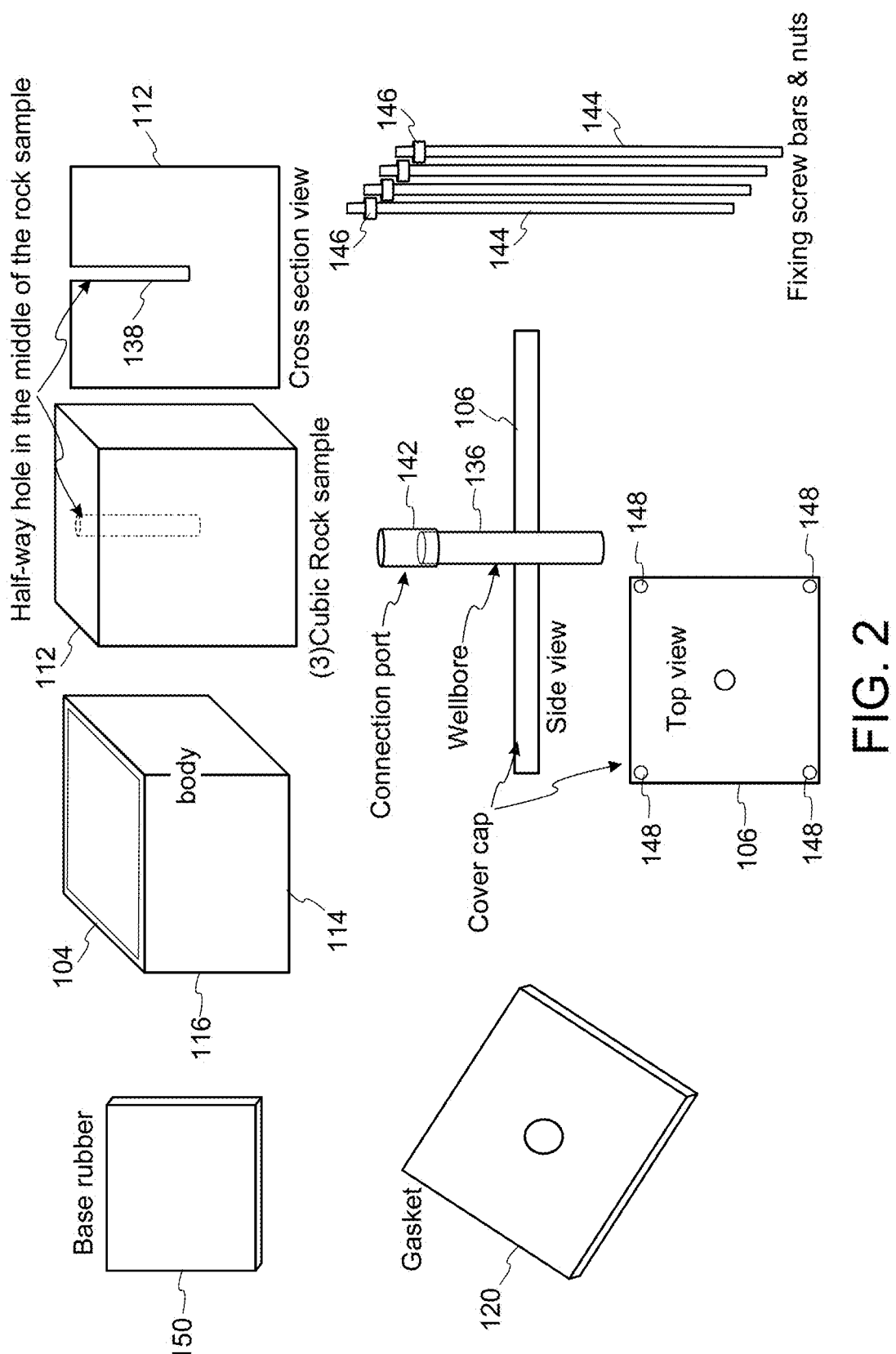
FIG. 2 is an exploded view of parts of the system of FIG. 1.

FIGS. 1-2 show a system 100 for determining effects of acoustic energy on fluid and rock interactions. The system 100 includes three subsystems: a housing 102 having a housing body 104 and a cover 106, a fluid system 108, and an acoustic wave generation system 110. The housing 102 can operate at reservoir conditions (e.g., reservoir pressure and temperature) to mimic a subsurface reservoir. The fluid system 108 provides fluids (e.g., gas, water, oil, downhole chemicals) to the housing. The acoustic wave generation system 110 generates acoustic waves to propagate through rock samples in the housing 102.

The housing 102 can be made from, for example, steel or stainless steel. The housing 102 can be pressurized and heated to reservoir pressures (e.g., 500-1000 psi, up to 5000 psi) and temperatures (e.g., 20-150° C.) to mimic reservoir conditions to determine effects of acoustic energy on fluid flow through a rock sample 112. The housing 102 is shown as a cuboid. Alternatively, the housing 102 can be cylindrical to accommodate cylindrical rock samples.

The housing body 104 includes a base 114, and sidewalls 116, with an interior sized to receive a rock sample 112. The housing body 104 has an interior size, for example, of 10 cubic inches. In some implementations, the interior volume of the housing body 104 can be 3 cubic inches or more, 5 cubic inches or more, or 10 cubic inches or less. The housing body 104 can be designed to accommodate a desired shape and volume of rock sample based on the particular application. The top 118 of the housing body allows access to the interior of the housing body 104 when the cover 106 is not installed on the housing body 104. When installed, the cover 106 forms a seal with the sidewalls 116. A gasket 120 is positioned between the sidewalls 116 and the rock sample 112 and the cover 106. The gasket 120 limits (e.g., prevents) fluids from leaking from the interior of the housing body 104. The gasket 120 is made from an elastomeric material (e.g., rubber).

The housing body 104 includes multiple fluid outlet ports 122 disposed along the sidewalls 116 of the housing. Pressure sensors 124 are coupled to fluid outlet lines 126 (e.g., piping, tubing, hosing, etc.). A back pressure regulator 128 is located at the outlet 130 of the fluid outlet lines 126. The back pressure regulator 128 maintains a specified pressure in the housing 102 during operation. One or more safety limit valves 132 are located on fluid inlet lines 134 and/or fluid outlet lines 126. The safety limit valves 132 are configured to release pressure from the system 100 if the pressure exceeds a determined safe operating pressure of the system 100. One or more temperature sensors 133 are positioned along the sidewall 116 of the housing 102 to measure the temperature within the housing 102. A heating element 135 can disposed along the side of the housing 102 to heat the housing 102. Alternatively, or additionally, a heating jacket or heating wrap can be placed on or around the housing 102 to heat the housing 102 in a uniform fashion.

The cover 106 includes a cylinder 136 protruding through the cover 106. The cylinder 136 simulates a wellbore. In a real field operation, the wellbore is used to introduce any fluids or tools to the well or to reservoir. The cylinder 136 enables the same function in the system 100. When the cover 106 is installed on the housing body 104, the cylinder 136 is disposed in a central bore 138 of the rock sample 112. A connection port 140 is attached to the top end 142 of the cylinder 136. The fluid inlet lines 134 are fluidly coupled to the connection port 140 enabling fluid to be introduced to the interior of the housing body 104 through the cylinder 136 simulating a wellbore. The cylinder 136 enables fluids and tools (e.g., acoustic transducer 156) to be introduced to the target zone of the rock sample 112.

The cover 106 is secured to the housing body 104 using threaded rods 144 and nuts 146. The threaded rods 144 are inserted through holes 148 in the cover. The threaded rods 144 are attached to the base 114 of the housing body 104. The nuts 146 are tightened onto the threaded rods to secure the cover 106 in place and seal the interior of the housing body 104. As shown in FIGS. 1-2, four threaded rods 144 are used to secure the cover 106. In some systems, the covers is attached to the body using latch clamps. For example, the latch clamps can be attached to sidewalls 116 of the housing body 104 and configured to latch onto the cover 106 when the cover 106 is installed on the housing body 104.

The rock sample 112 is positioned inside the housing 102 on top of an elastomeric base 150 (e.g., a rubber base). The elastomeric base 150 absorbs stress across the rock sample 112 and reduces the likelihood of the rock sample from being crushed inside the housing 102. The rock sample 112 can be large (e.g., 5 to 10 cubic inches) relative to the size of core sample plugs (e.g., 0.5 to 5 cubic inches). Core sample plugs, for example, are commonly cylindrical with a diameter of 1.5 inches and a length of 3 inches.

The fluid system 108 includes a fluid pump 152 and one or more fluid cylinders 154. The fluid pump 152 generates pressure to inject the fluid in the fluid cylinders 154 into the interior of the housing through fluid inlet lines 134. The fluid pump 152 pressurizes the housing 102 to the desired operating pressure (e.g., the reservoir pressure, 500 psi or more, 1000 psi or more, 5000 psi or less). The fluid in the fluid cylinders 154 can depend on the particular experiment being conducted. The fluid cylinders 154 can include for example, gas, water, oil, chemicals, etc. The fluid cylinders 154 can include a floating piston in the interior of the cylinder. The fluid pump 152 can pump a fluid (e.g., water) into the inlet of the cylinder (e.g., upstream end of the cylinder) to cause the floating piston to displace fluid through the outlet of the cylinder (e.g., downstream end of the cylinder). The flow rate of fluid through the pump can be used to determine the flow rate of fluid through the housing 102.

The acoustic wave generation system 110 includes an acoustic transducer 156, an acoustic generator 158, and a data processing system 160. The acoustic transducer 156 is inserted into the central bore 138 of the rock sample 112 through the cylinder 136. The acoustic transducer 156 is electrically coupled to the acoustic generator 158 through a connecting wire 162. The connecting wire 162 passes into the cylinder 136 through an electrical connection port 164 attached to the top end 142 of the cylinder 136.

The data processing system 160 generates commands to control the acoustic generator 158. For example, the data processing system can generate an amplitude and frequency of an acoustic wave to be generated by the acoustic generator 158. The data processing system 160 can cause the acoustic generator 158 to produce the acoustic wave.

Figure 3A:
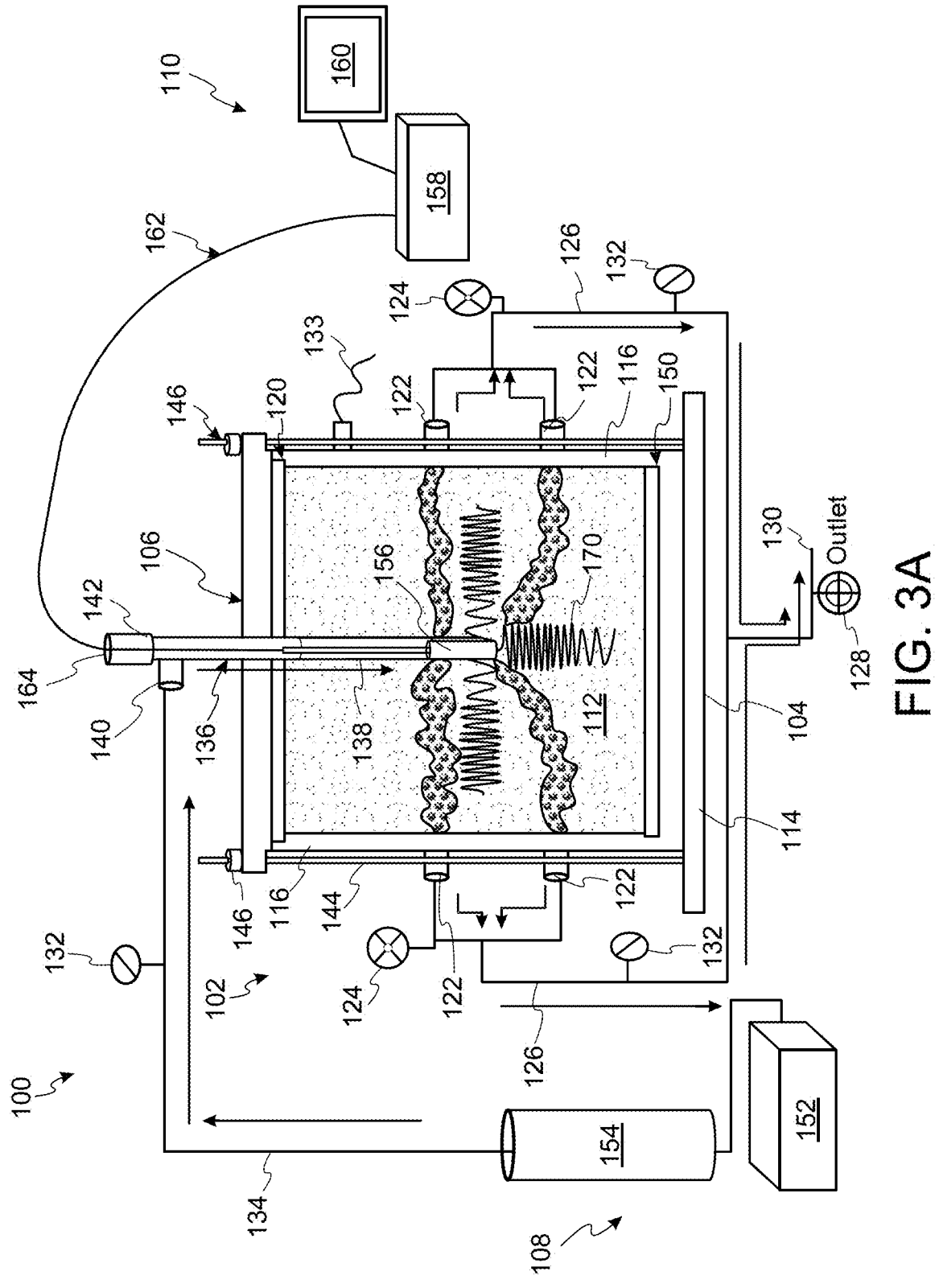
FIG. 3A is a schematic illustration of the system of FIG. 1 showing fluid flow directions and acoustic energy propagation.

FIG. 3A is a schematic diagram of system 100 during an example operation. Fluid flows from fluid cylinders 154 through fluid inlet lines 134 to connection port 140. The fluid flows through the connection port 140 through cylinder 136 into the central bore 138 of the rock sample 112. The fluid flows from the central bore 138 through the rock sample 112 to the fluid outlet ports 122. Fluid collected at the fluid outlet ports 122 flows through the fluid outlet lines 126 to the outlet 130.

The acoustic generator 158 sends electrical signals through connection wire 162 to the acoustic transducer 156. The acoustic transducer 156 converts the electrical signals to acoustic waves 170. The acoustic waves 170 propagate through the rock sample 112.

Figure 3B:
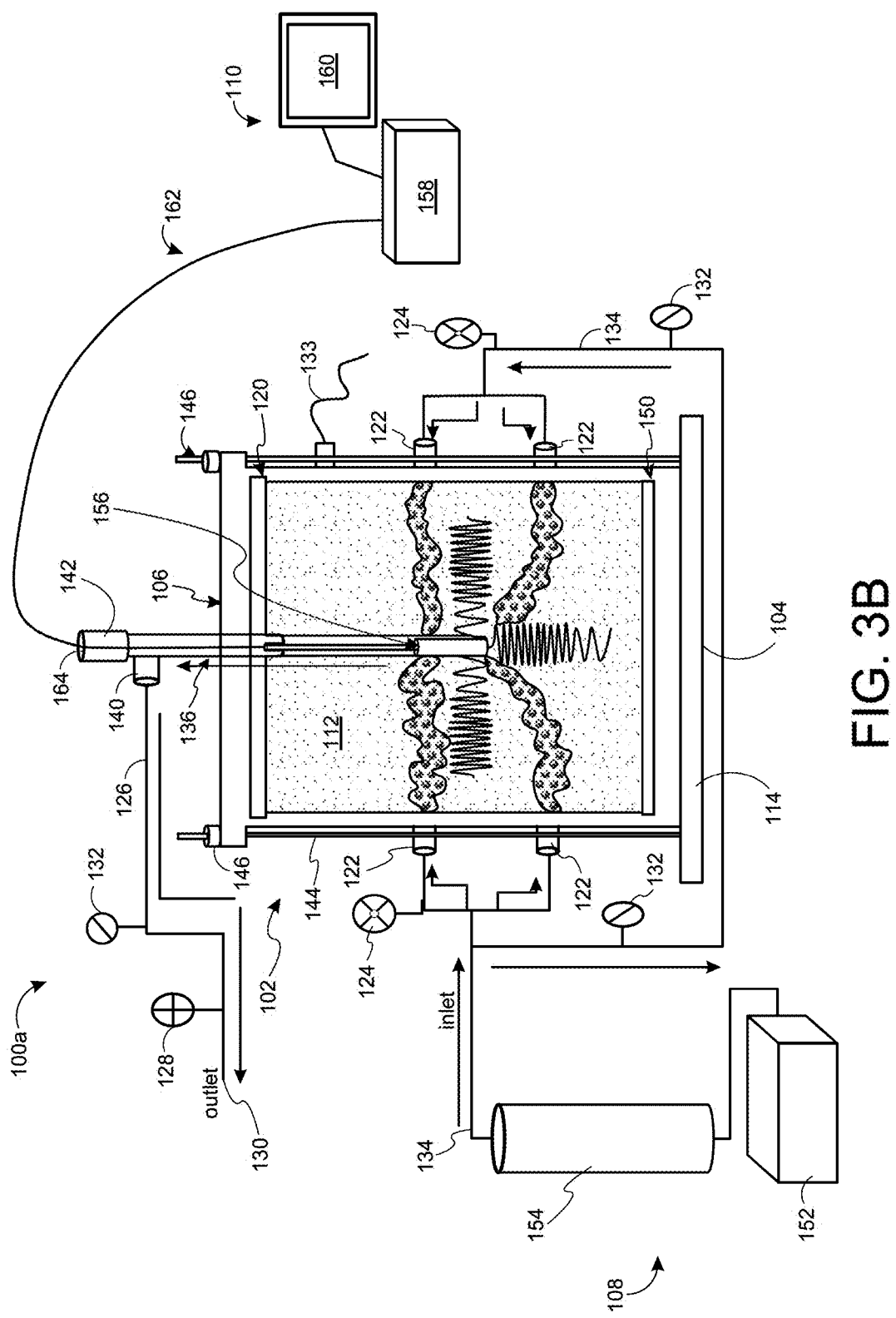
FIG. 3B is a schematic illustration of a system for determining effects of acoustic energy on fluid and rock interactions in a production mode.

FIG. 3B is a schematic diagram of system 100a during an example operation. System 100a is substantially similar to system 100. However, in system 100a the flow direction is reversed. The fluid is injected through the fluid outlet ports 122 and flows to the cylinder 136 mimicking production from a well. The inlet lines 134 are fluidly coupled to the fluid outlet ports 122. The fluid outlet lines 126 are fluidly coupled to the connection port 140. The fluid pump 152 pumps fluid from the fluid cylinders 154 through the fluid inlet lines 134 to the fluid outlet ports 122. The fluid flows from the fluid outlet ports 122 through the rock sample 112 to the central bore 138. The fluid flows from the central bore 138 through the cylinder 136 to the connection port 140. The fluid flows from the connection port 140 through the fluid outlet lines 126 to the outlet 130. In this configuration, the effects of acoustic energy on production from a wellbore can be investigated.

Figure 4:
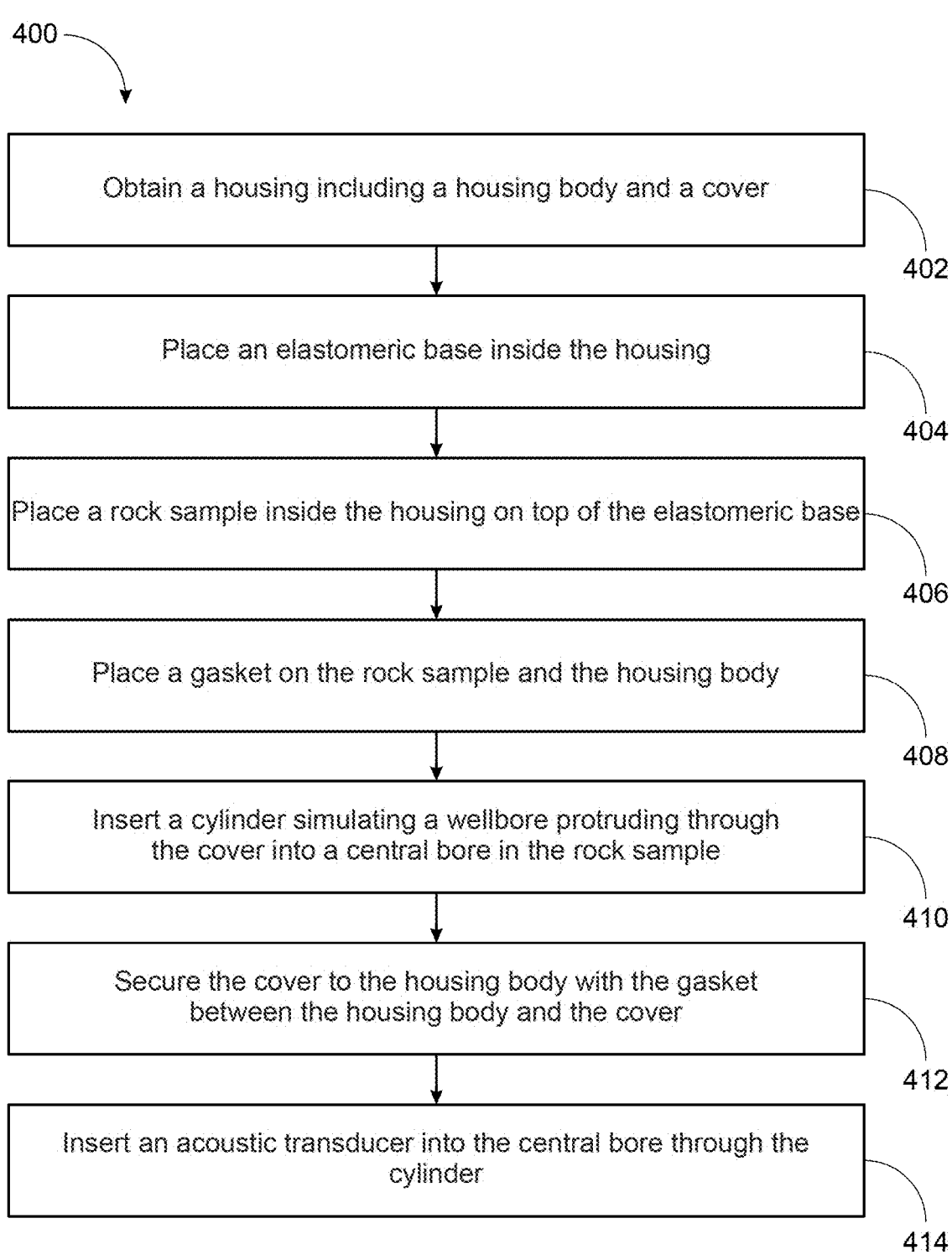
FIG. 4 is a flow chart of a method of assembling the system of FIGS. 1-3A.

FIG. 4 is a flow chart of a method 400 for assembling a system for determining effects of acoustic energy on fluid and rock interactions (e.g., system 100). The method 400 can be performed by one or more assemblers (e.g., a person, a user, an operator, etc.). In some implementations, the steps of the method 400 can be performed by an automated assembly system.

An assembler obtains a housing including a housing body and a cover (step 402). The assembler places an elastomeric base (e.g., rubber base) inside the housing (step 404). The assembler places a rock sample inside the housing on top of the elastomeric base (step 406). The assembler places a gasket on the rock sample and the housing body (step 408). The assembler inserts a cylinder simulating a wellbore that protrudes through the cover into a central bore in the rock sample (step 410). The assembler secures the cover to the housing body with the gasket between the housing body and the cover (step 412). For example, the assembler uses threaded rods, washers, and nuts to secure the cover to the housing body. The gasket forms a fluid tight seal between the housing body and the cover.

The assembler inserts an acoustic transducer into the central bore through the cylinder (step 414). The assembler can fluidly couple a pump for injecting fluids to a connection port attached to the cylinder. The assembler can couple fluid outlet lines to outlet ports disposed along sidewalls of the housing body. The assembler can couple one or more sensors (e.g., pressure sensors, temperature sensors, flow rate sensors) to the housing body and/or fluid lines of the system. The assembler can inject fluid into the rock sample using the pump to pressurize the housing body.

Figure 5:
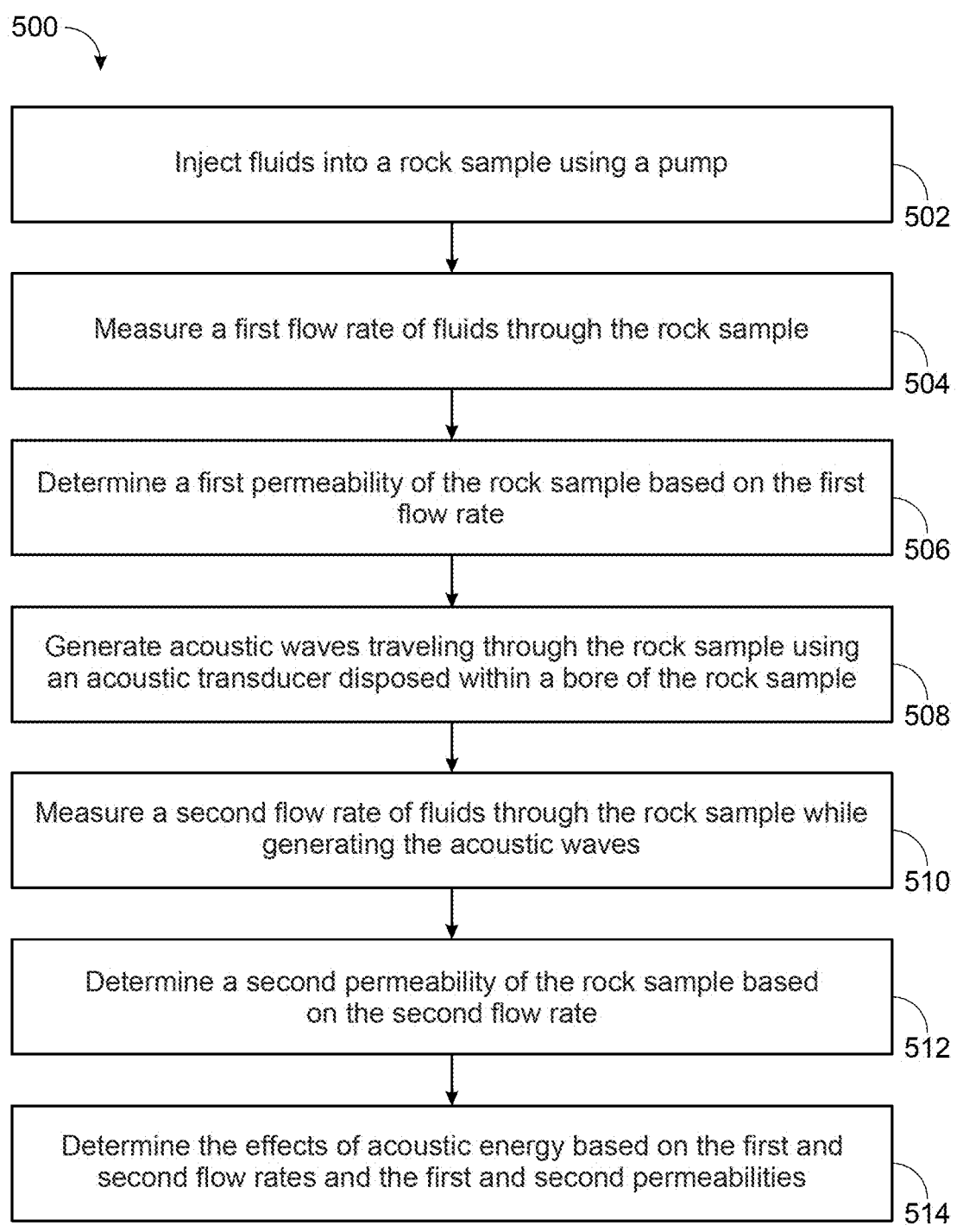
FIG. 5 is a flow chart of a method for determining effects of acoustic energy on fluid and rock interactions.

FIG. 5 is a flow chart for an example method 500 for determining effects of acoustic energy on fluid and rock interactions. The method 500 can be implemented on a data processing system (e.g., data processing system 160 or the computer system of FIG. 6).

The data processing system injects fluids into a rock sample using a pump (step 502). For example, the data processing system generates commands to operate the pump to generate a fluid flow from fluid cylinders into the rock sample.

The data processing system measures a first flow rate of fluids through the rock sample (step 504). For example, the flow rate can be measured based on the flow rate of fluids generated by the pump.

The data processing system determines a first permeability of the rock sample based on the first flow rate (step 506). For example, the data processing system determines permeability based on a differential pressure measurement between the fluid inlet and the fluid outlet. The data processing system measure the pressure at the fluid inlet through a pressure sensor coupled to the flow inlet lines and/or through the pump. The data processing system can measure the pressure at the fluids outlet using a pressure sensor coupled to the fluid outlet.

The data processing system generates acoustic waves that travel through the rock sample using an acoustic transducer that is positioned within a bore of the rock sample (step 508). For example, the data processing system sends control commands to an acoustic generator to generate electrical signals that cause the acoustic transducer to generate the acoustic waves that travel through the rock sample. The data processing system can cause a variety of waveforms having varying amplitudes, frequencies, and shapes (e.g., sawtooth, sinusoid, step) based on the design of the experiment.

The data processing system measures a second flow rate of fluids through the rock sample while generating the acoustic waves (step 510).

The data processing system determines a second permeability of the rock sample based on the second flow rate (step 512).

The data processing system determines the effects of acoustic energy based on the first and second flow rates and the first and second permeabilities (step 514). For example, the data processing can determine that the acoustic energy increases or decreases the flow rate and/or permeability based on whether the second flow rate and/or permeability is less than or greater than the first permeability. Additionally, or alternatively, the data processing system can determine the effect of acoustic energy on the fluid properties.

In some implementations, the data processing system controls the acoustic generator to generate acoustic waves with varying acoustic frequency and/or acoustic power. The data processing determines the effects of acoustic frequency and/or acoustic power based on measured flow rates and measured permeabilities acquired at the two or more acoustic frequencies and/or acoustic powers.

In some implementations, the data processing system heats the rock sample to a reservoir temperature. For example, the data processing system operates a heating element or a heating jacket placed over the housing to heat the rock sample to the desired temperature.

In some implementations, the data processing system regulates the pressure in the housing by operating a pump and/or a pressure regulator to maintain a reservoir pressure within the rock sample.

In some implementations, the system can be used to determine the effect of different fluids on rock permeability. For example, two or more fluids can be injected into the housing via the injection pump during two or more different test runs. The results of the two or more test runs with the two or more different fluids can be compared to determine the effects of the different fluids on the rock permeability.

Figure 6:
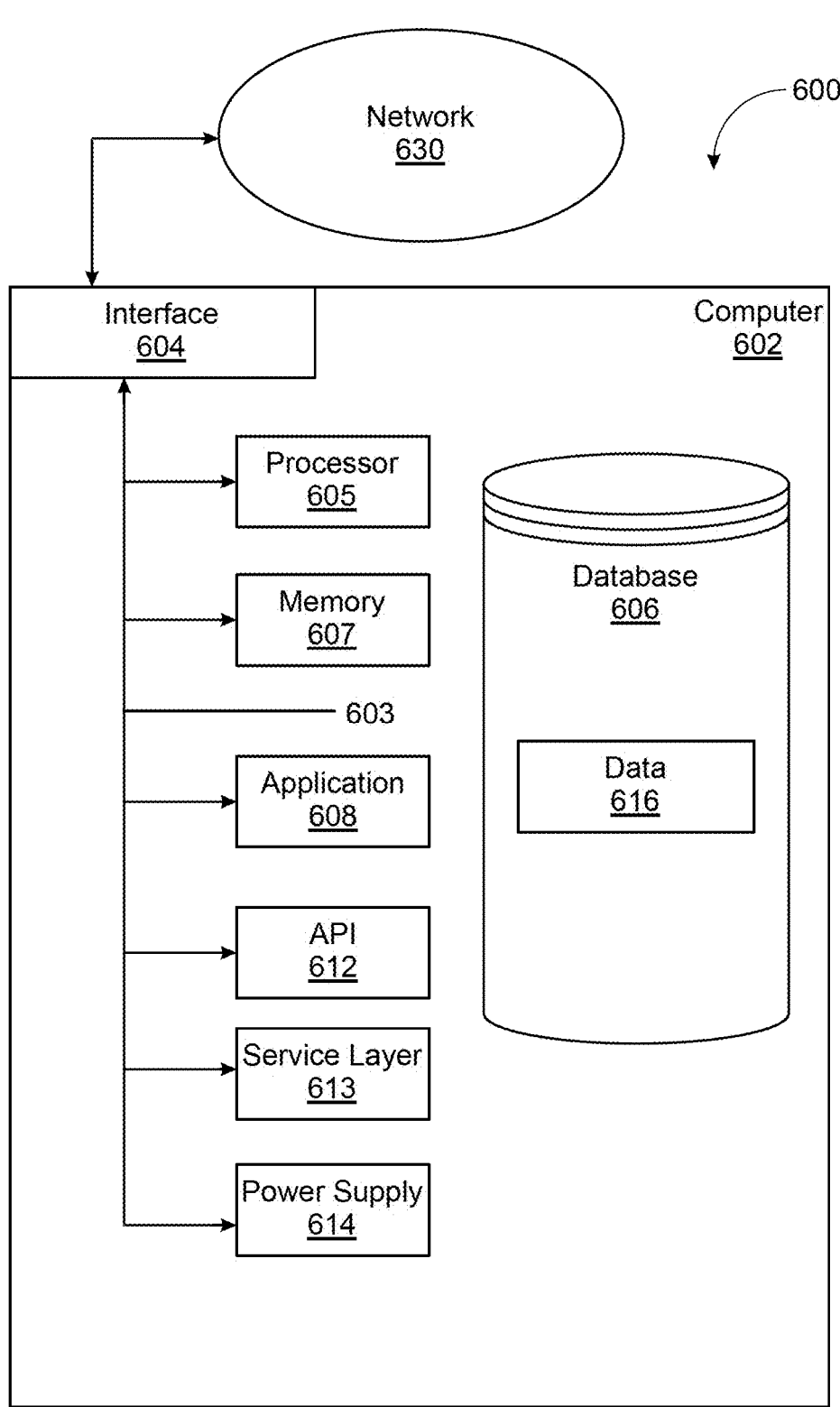
FIG. 6 is a block diagram illustrating an example computer system used to provide computational functionalities associated with described algorithms, methods, functions, processes, flows, and procedures according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can hold data 616 (e.g., resistivity data). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure.

Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of these systems and methods have been described. Nevertheless, it will be understood that various modifications may be made without departing from the spirit and scope of this disclosure. Accordingly, other implementations are within the scope of the following claims.

Examples

In an example implementation, a system for determining effects of acoustic energy on fluid and rock interactions includes a housing including a housing body and a cover; an elastomeric base disposed within the housing body; a gasket disposed between the housing body and the cover when the cover is installed on the housing body; a cylinder simulating a wellbore protruding through the cover and a connection port attached at one end of the cylinder; one or more sensors disposed on the housing body; and an acoustic transducer disposed in the cylinder.

An aspect combinable with the example implementation includes a pump fluidly coupled to the connection port configured to pump fluids into the housing and pressurize the housing to a specified pressure.

In another aspect combinable with any of the previous aspects, the specified pressure is between 500 and 1000 pounds per square inch.

Another aspect combinable with any of the previous aspects includes one or more fluid cylinders fluidly coupled between the pump and the housing.

In another aspect combinable with any of the previous aspects, the one or more sensors includes a pressure sensor and a temperature sensor.

In another aspect combinable with any of the previous aspects, the housing body defines an interior cavity with a volume between 5 and 10 cubic inches.

In another aspect combinable with any of the previous aspects, a rock sample having a central bore include a volume between 5 and 10 cubic inches.

Another aspect combinable with any of the previous aspects includes an acoustic generator electrically coupled to the acoustic transducer.

Another aspect combinable with any of the previous aspects includes a computing device configured to control a temperature of the housing, a pressure of the housing, and the acoustic generator.

In another aspect combinable with any of the previous aspects, the housing body and the cover comprise steel.

Another aspect combinable with any of the previous aspects includes a heating jacket disposed around the housing.

In another example implementation, a method for determining effects of acoustic energy on fluid and rock interactions includes inserting a cylinder simulating a wellbore into a central bore of a rock sample; inserting an acoustic transducer into the central bore of the rock sample through the cylinder; injecting fluids into the rock sample through the cylinder using a pump; measuring a first flow rate of fluids through the rock sample; determining a first permeability of the rock sample based on the first flow rate; generating acoustic waves traveling through the rock sample using the acoustic transducer disposed within the central bore of the rock sample; measuring a second flow rate of fluids through the rock sample while generating the acoustic waves; and determining a second permeability of the rock sample based on the second flow rate; determining the effects of acoustic energy based on the first and second flow rates and the first and second permeabilities.

An aspect combinable with the example implementation includes heating the rock sample to a reservoir temperature.

In another aspect combinable with any of the previous aspects, heating the rock sample includes heating the rock sample using a heating element or a heating jacket.

Another aspect combinable with any of the previous aspects includes regulating a pressure of the fluids in the rock sample to maintain a reservoir pressure within the rock sample.

In another example implementation, a method for assembling a system for determining effects of acoustic energy on fluid and rock interactions includes obtaining a housing including a housing body and a cover; placing an elastomeric base inside the housing; placing a rock sample inside the housing on top of the elastomeric base; placing a gasket on the rock sample and the housing body; inserting a cylinder simulating a wellbore into a central bore of the rock sample, the cylinder protruding through the cover; securing the cover to the housing body with the gasket between the housing body and the cover; and inserting an acoustic transducer into the central bore of the rock sample through the cylinder.

An aspect combinable with the example implementation includes fluidly coupling a pump to a connection port attached to an end of the cylinder.

Another aspect combinable with any of the previous aspects includes injecting fluid into the rock sample to pressurize the housing body.

In another aspect combinable with any of the previous aspects, securing the cover to the housing body includes securing the cover to the housing body using threaded rods and nuts.

Another aspect combinable with any of the previous aspects includes coupling one or more sensors to the housing to measure properties of fluids in the rock sample.

What is claimed is:

1. A system for determining effects of acoustic energy on fluid and rock interactions, the system comprising:
  a housing comprising a housing body and a cover;
  an elastomeric base disposed within the housing body;
  a gasket disposed between the housing body and the cover when the cover is installed on the housing body;
  a cylinder simulating a wellbore protruding through the cover and a connection port attached at one end of the cylinder;
  one or more sensors disposed on the housing body; and
  an acoustic transducer disposed in the cylinder.

2. The system of claim 1, further comprising a pump fluidly coupled to the connection port to pump fluids into the housing and pressurize the housing to a specified pressure.

3. The system of claim 2, wherein the specified pressure is between 500 and 1000 pounds per square inch.

4. The system of claim 2, further comprising one or more fluid cylinders fluidly coupled between the pump and the housing.

5. The system of claim 1, wherein the one or more sensors comprise a pressure sensor and a temperature sensor.

6. The system of claim 1, wherein the housing body defines an interior cavity with a volume between 5 and 10 cubic inches.

7. The system of claim 6, wherein a rock sample having a central bore comprises a volume between 5 and 10 cubic inches.

8. The system of claim 1, further comprising an acoustic generator electrically coupled to the acoustic transducer.

9. The system of claim 8, further comprising a computing device operable to control a temperature of the housing, a pressure of the housing, and the acoustic generator.

10. The system of claim 1, wherein the housing body and the cover comprise steel.

11. The system of claim 1, further comprising a heating jacket disposed around the housing.

12. A method for determining effects of acoustic energy on fluid and rock interactions, the method comprising:
  inserting a cylinder simulating a wellbore into a central bore of a rock sample;
  inserting an acoustic transducer into the central bore of the rock sample through the cylinder;

injecting fluids into the rock sample through the cylinder using a pump;

measuring a first flow rate of fluids through the rock sample;

determining a first permeability of the rock sample based on the first flow rate;

generating acoustic waves traveling through the rock sample using the acoustic transducer disposed within the central bore of the rock sample;

measuring a second flow rate of fluids through the rock sample while generating the acoustic waves; and determining a second permeability of the rock sample based on the second flow rate;

determining the effects of acoustic energy based on the first and second flow rates and the first and second permeabilities.

13. The method of claim 12, further comprising heating the rock sample to a reservoir temperature.

14. The method of claim 13, wherein heating the rock sample comprises heating the rock sample using a heating element or a heating jacket.

15. The method of claim 12, further comprising regulating a pressure of the fluids in the rock sample to maintain a reservoir pressure within the rock sample.

16. A method for assembling a system for determining effects of acoustic energy on fluid and rock interactions, the method comprising:

obtaining a housing comprising a housing body and a cover;

placing an elastomeric base inside the housing;

placing a rock sample inside the housing on top of the elastomeric base;

placing a gasket on the rock sample and the housing body;

inserting a cylinder simulating a wellbore into a central bore of the rock sample, the cylinder protruding through the cover;

securing the cover to the housing body with the gasket between the housing body and the cover; and inserting an acoustic transducer into the central bore of the rock sample through the cylinder.

17. The method of claim 16, further comprising fluidly coupling a pump to a connection port attached to an end of the cylinder.

18. The method of claim 17, further comprising injecting fluid into the rock sample to pressurize the housing body.

19. The method of claim 16, wherein securing the cover to the housing body comprises securing the cover to the housing body using threaded rods and nuts.

20. The method of claim 16, further comprising coupling one or more sensors to the housing to measure properties of fluids in the rock sample.

\* \* \* \* \*